United States Patent
Speer

(10) Patent No.: US 6,976,441 B1
(45) Date of Patent: Dec. 20, 2005

(54) FERTILIZER DISPENSING DEVICE

(76) Inventor: James W. Speer, 1975 E. Speer Rd., Atoka, OK (US) 74525

(*) Notice: Subject to any disclaimer, the term of this patent is extended or adjusted under 35 U.S.C. 154(b) by 119 days.

(21) Appl. No.: 10/429,404

(22) Filed: May 6, 2003

(51) Int. Cl.[7] .......................... A01C 7/08; A01C 17/00
(52) U.S. Cl. .................................................. 111/130
(58) Field of Search ..................... 111/115, 118, 7.1, 111/7.2, 89, 92, 93, 901, 130

(56) References Cited

U.S. PATENT DOCUMENTS

| | | | |
|---|---|---|---|
| 2,162,057 A * | 6/1939 | Brandt et al. | 239/154 |
| 4,106,643 A | 8/1978 | McGehee | |
| 4,286,530 A | 9/1981 | Conley | |
| 4,725,004 A * | 2/1988 | Baran, Jr. | 239/164 |
| 4,821,959 A | 4/1989 | Browning | |
| 5,106,020 A * | 4/1992 | Harrell | 239/172 |
| 5,190,218 A * | 3/1993 | Kayser et al. | 239/172 |
| 5,193,469 A | 3/1993 | Tochor | |
| D355,019 S | 1/1995 | Spanke | |
| 5,385,306 A * | 1/1995 | Cervenka | 239/663 |
| 5,396,962 A * | 3/1995 | Reincke | 172/604 |
| 5,485,963 A | 1/1996 | Walto et al. | |
| 5,503,090 A | 4/1996 | Guzan | |
| 5,533,676 A * | 7/1996 | Conley | 239/663 |
| 6,029,589 A * | 2/2000 | Simpson | 111/7.2 |
| 6,502,771 B1 * | 1/2003 | Wyne | 239/663 |
| 6,637,678 B2 * | 10/2003 | Wyne | 239/663 |
| 6,808,126 B1 * | 10/2004 | Dunlap | 239/172 |

* cited by examiner

Primary Examiner—Christopher J. Novosad

(57) ABSTRACT

A fertilizer dispensing device for dispensing fertilizer from an all-terrain vehicle includes a container having a bottom wall and a peripheral wall that is attached to and extends upwardly from the bottom wall. An outlet is fluidly coupled to the container. A bracket is attached to the container for selectively attaching the container to a rear portion of the all-terrain vehicle. Fertilizer may be positioned in the container such that the fertilizer flows outward of the container through the outlet.

7 Claims, 3 Drawing Sheets

FERTILIZER DISPENSING DEVICE

BACKGROUND OF THE INVENTION

1. Field of the Invention

The present invention relates to fertilizer dispensers and more particularly pertains to a new fertilizer dispenser which is mountable on an all-terrain vehicle for easy dispensing of a fertilizer in a garden.

2. Description of the Prior Art

The use of fertilizer, seed and other dispensers are known in the prior art. U.S. Pat. No. 4,286,530 describes a device for dispensing seeds in multiple rows. Another type of fertilizer dispenser is U.S. Pat. No. 4,821,959 having a plurality of sprayers for dispensing fluids.

While these devices fulfill their respective, particular objectives and requirements, the need remains for a device that is mountable to an all-terrain vehicle.

SUMMARY OF THE INVENTION

The present invention meets the needs presented above by providing a container attached to a bracket. The bracket is removably attachable to the rear portion of an all-terrain vehicle.

Another object of the present invention is to provide a new fertilizer dispenser that includes outlets having a plurality of tubular members so that the user may select the number of dispensing lines and their positioning within or outside of the width of the all-terrain vehicle.

To this end, the present invention generally comprises a container having a bottom wall and a peripheral wall that is attached to and extends upwardly from the bottom wall. An outlet is fluidly coupled to the container. A bracket is attached to the container for selectively attaching the container to a rear portion of an all-terrain vehicle. Fertilizer may be positioned in the container such that the fertilizer flows outward of the container through the outlet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
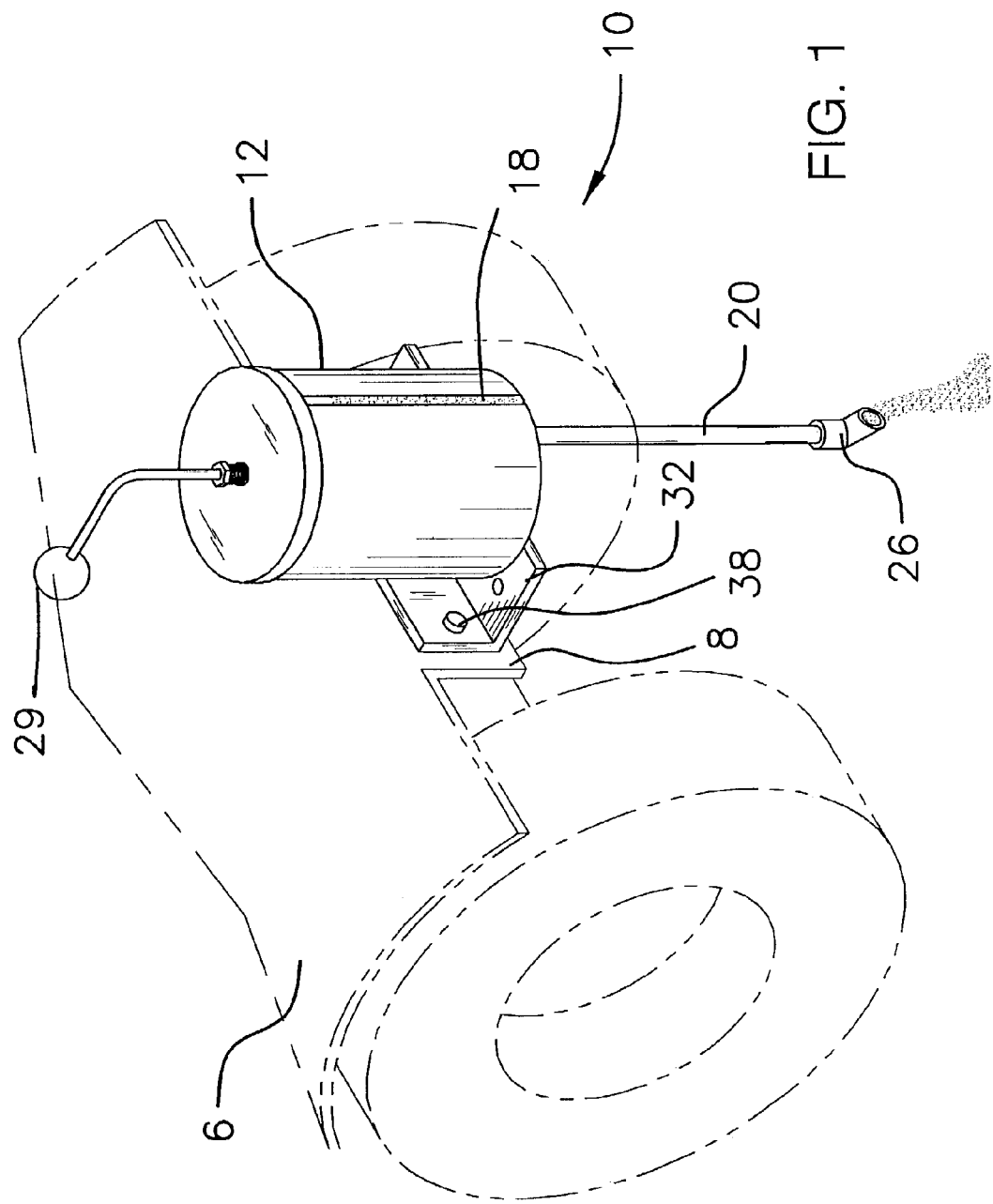
FIG. 1 is a schematic perspective view of a fertilizer dispensing device according to the present invention.
Figure 2:
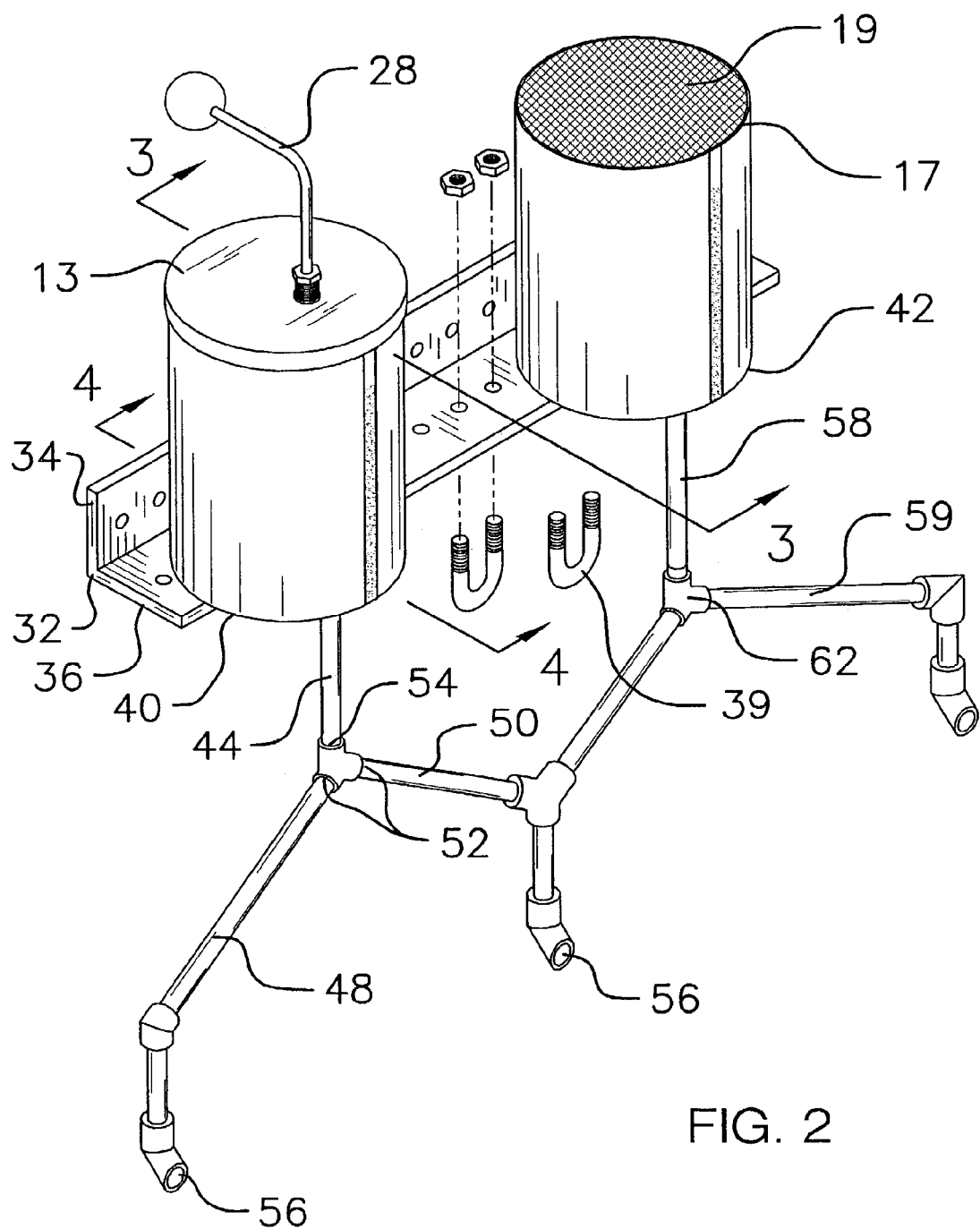
FIG. 2 is a schematic perspective view of an alternate embodiment of the present invention.

With reference now to the drawings, and in particular to FIGS. 1 through 4 thereof, a new fertilizer dispenser embodying the principles and concepts of the present invention and generally designated by the reference numeral 10 will be described.

As best illustrated in FIGS. 1 through 4, the fertilizer dispensing device 10 generally comprises a container 12 having a bottom wall 14 and a peripheral wall 16 that is attached to and extends upwardly from the bottom wall 14. The peripheral wall 16 has a window 18 mounted therein and extending from the bottom wall 14 to an upper edge 17 of the peripheral wall 16 for selective viewing into an interior of the container 12. The window 18 in the container 12 is preferably comprised of translucent plastic material. A screen 19 is attached to the container 12 and is positioned such that the screen 19 extends across an opening of the container 12 defined by an upper edge 17 of the peripheral wall 16. The screen 19 is preferably a wire mesh material and it allows fertilizer 60 to enter the container 12 while preventing clumps of fertilizer 60 material, or relatively large portions of foreign particulate, from entering the container 12.

An outlet 20 is fluidly coupled to the container 12. The outlet 20 comprises an elongated tubular member having a first end 24 and a second end 26. Each of the first 24 and second 26 ends is open. The first end 24 is fluidly coupled to the container 12 such that the second end 26 extends away from the container 12. The first end 24 is positioned in the bottom wall 14 such that the outlet 20 extends downward from the container 12. The screen 19, by preventing clumps of fertilizer 60 from entering the container 12, ensures that the fertilizer 60 does not clog the elongated tubular member, or outlet 20.

Figure 3:
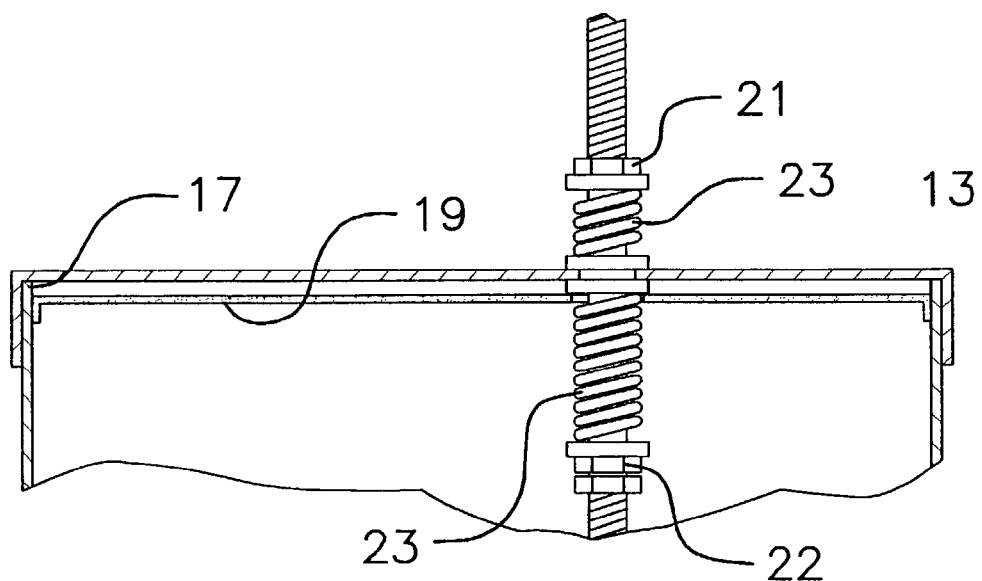
FIG. 3 is a schematic cross-sectional view taken along line 3—3 of FIG. 1 of the present invention.
Figure 4:
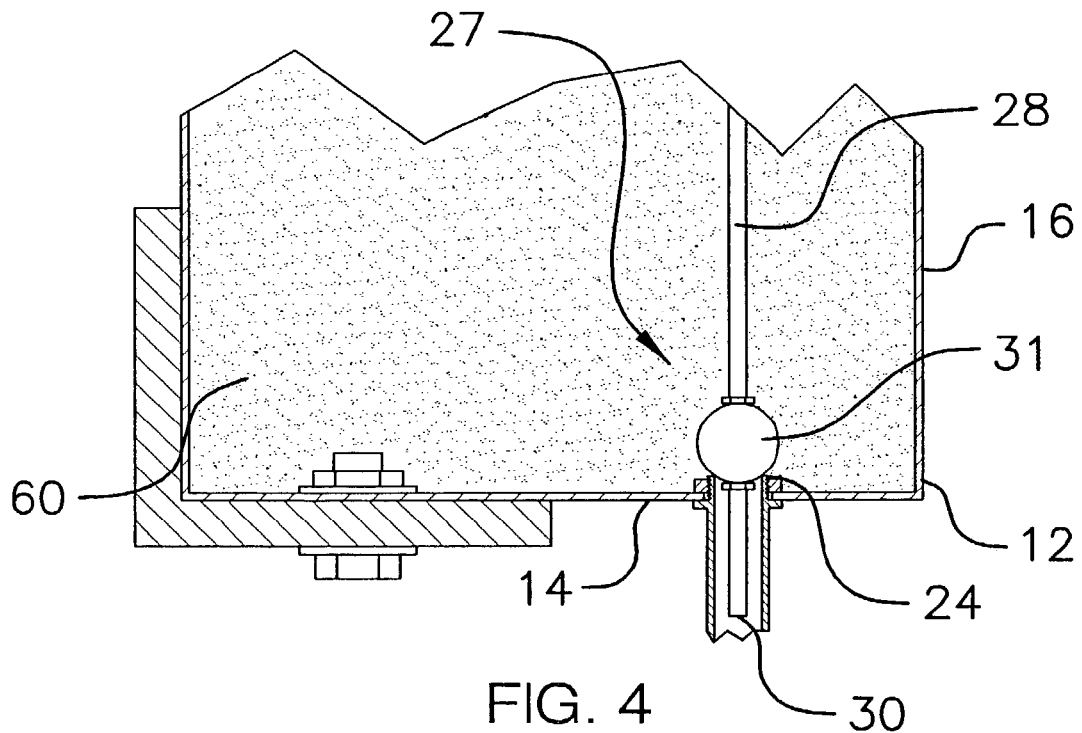
FIG. 4 is a schematic cross-sectional view taken along line 4—4 of FIG. 3 of the present invention.

A valve 27 is positioned in fluid junction with the outlet 20 for selectively opening or closing the outlet 20. The valve 27 is selectively positionable in an open position or a closed position. FIGS. 3 and 4 more clearly depict one version of the valve 27 which includes a rod 28 having a first end 29 and a second end 30. The second end 29 is extended into the outlet 20. The rod 28 extends through a ball stop 31 which is positioned generally adjacent to the second end 29 and within the container 12 such that it may cover the first end 24 of the outlet 20. The rod 28 extends through a cover 13 which is positionable on container 12 and the rod 28 extends through the screen 19. A first stop 21 is positioned on the rod 28 above the cover 13 and a second stop 22 is positioned on the rod 28 below the cover 13. The rod 28 is threadably coupled to the first 21 and second 22 stops. Biasing means 23, preferably springs, are positioned on the rod 28 on either side of the cover 13 for biasing the stops 21, 22 away from the cover 13. The biasing means 23 positioned below the cover 13 exerts a greater force than the biasing means 23 above the cover 13. When the rod 28 is turned in a first direction, the ball stop 31 lifts upwardly away from the outlet 20. As fertilizer 60 flows outward, the rod 28 turns in a second direction from downward force by the biasing means 23 below the cover 13 to return the ball stop 31 to a position covering the outlet 20. By selecting a desired amount of turns of the rod 28, the user will be able to select the desired amount of fertilizer 60 to release. It is noted that this only one type of suitable valve. 27 and that alternate types of valves may be utilized, including valves positioned in the outlet 20 or analog type valves which include an electronic switch positioned in a convenient position for the user of the device 10.

A bracket 32 is attached to the container 12 for selectively attaching the container 12 to a rear portion 8 of an all-terrain vehicle 6. The bracket 32 includes a leg portion 34 and a foot portion 36 attached to each other at a generally perpendicular angle. The container 12 is positioned on and attached to the foot portion 36. A plurality of mechanical fasteners 38 is adapted for removably attaching the leg portion 34 to the rear portion 8. The mechanical fasteners 38 are conventional and may include bolts, clips or the like. U-shaped bolts 39 may be used for attaching the container 12 to the bracket 32.

Alternate embodiments of the device 10 include a first container 40 and a second container 42 for holding additional fertilizer 60. Also, the outlet 20 may include a first tubular member 44 having a first end 24 attached to the first container 40 and a second tubular member 48 and a third tubular member 50 each having first ends 52 attached to a second end 54 of the first tubular member 44, or first outlet. The second 48 and third 50 tubular members having second ends 56 extending away in such a manner that the outlet 20 of this embodiment has a generally Y-shaped configuration. In the case of a second container 42, a second outlet 58 would be fluidly coupled to the outlet 20 attached to the first container 40 and would include additional tubular members 59. As is easily envisioned, the addition of Y-shaped extensions as is seen with the second 48 and third 50 tubular members allows for great variations of the number of outlets and containers that may be simultaneously used. The exact configuration may be modified depending on the area or number of rows being fertilized.

In use, fertilizer 60 be positioned in the container 12, or in the case of two containers the first 40 and second 42 containers, and the valve 27 opened such that the fertilizer 60 flows outward of the container 12 through the outlet 20, 58. The device 10 is mounted on the rear portion 8 of an all-terrain vehicle 6 for dispensing fertilizer 60 or other materials in along a row in a garden. Multiple tubular members are used for dispensing material in multiple rows. Preferably the tubular members are modular with couplers 62 used for attaching multiple tubular members together in any desired configuration. The windows 18 in the containers allow the user to see when additional fertilizer 60 needs to be added to the containers 12, 40 and 42.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fertilizer dispensing device for selective mounting on a rear portion of an all-terrain vehicle, said device comprising;
   a container having a bottom wall and a peripheral wall being attached to and extending upwardly front said bottom wall;
   an outlet being fluidly coupled to said container, said outlet consisting of an elongated tubular member having a first end and a second end, each of said first and second ends being open, said first end being fluidly coupled to said container such that said second end extends away from said container, said elongated tubular member being vertically orientated and extending downwardly from said container;
   a bracket being attached to said container for selectively attaching said container to the rear portion, said bracket including a leg portion and a foot portion attached to each other at a generally perpendicular angle, said container being positioned on and attached to said foot portion, said leg portion extending upwardly from said foot portion, a plurality of mechanical fasteners being adapted for removably attaching said leg portion to the rear portion, said first end being positioned in said bottom wall such that said outlet extends downward from said container;
   a screen being attached to said container and being positioned such that said screen extends across an opening of said container defined by an upper edge of said peripheral wall; and
   dry fertilizer being poured through said screen and into said container such that the fertilizer flows outward of said container through said outlet.

2. The fertilizer dispensing device of claim 1, further including a window mounted being mounted in said peripheral wall for selective viewing into an interior of said container.

3. The fertilizer dispensing device of claim 1, further including a valve being in fluid junction with said outlet for selectively opening or closing said outlet.

4. The fertilizer dispensing device of claim 1, wherein said container defines a first container, a second container being attached to said bracket, said outlet being fluidly coupled to said second container, wherein fertilizer may be positioned in said first and second containers such that the fertilizer flows outward of said first and second containers.

5. The fertilizer dispensing device of claim 1, wherein said outlet comprises a first tubular member having a first end and a second end, said first end of said first tubular member being fluidly coupled to and extending downwardly away from said container, a second tubular member and a third tubular member, each of said second and third tubular members having a first end and a second end, said first ends of said second and third tubular members being fluidly coupled to said second cad of said first tubular member, said second and third tubular members extending downwardly and outwardly away from said first tubular member and from each other such that said outlet has a Y-shaped configuration.

6. The fertilizer dispensing device of claim 5, further Including a valve being in fluid junction with said first tubular member for selectively opening or closing said outlet.

7. A fertilizer dispensing device for selective mounting on a rear portion of an all-terrain vehicle, said device consisting of:
   a container having a bottom wall and a peripheral wall being attached to and extending upwardly from said bottom wall, said peripheral wall having a window mounted therein and extending from said bottom, wall to an upper edge of said peripheral wall for selective viewing into an interior of said container;
   an outlet being fluidly coupled to said container, said outlet comprising an elongated tubular member having a first end and a second end, each of said first and second ends being open said first end being fluidly coupled to said container such that said second end extends away from said container, said first and being positioned in said bottom wall such that said outlet extends downward from said container, said tubular member being vertically orientated and extending downwardly from said container;

a valve being in fluid junction with said outlet for selectively opening or closing said outlet;

a bracket being attached to said container for selectively attaching said container to the rear portion, said bracket including a leg portion and a foot portion attached to each other at a generally perpendicular angle, said container being positioned on and attached to said foot portion, said leg portion extending upwardly front said foot portion, a plurality of mechanical fasteners being adapted for removably attaching said leg portion to the rear portion;

a screen being attached to said container and being positioned such that said screen extends across an opening of said container defined by an upper edge of said peripheral wall; and dry fertilizer being poured through said screen and into said container and said valve opened such that the fertilizer flows outward of said container through said outlet.

* * * * *